Figure 1:
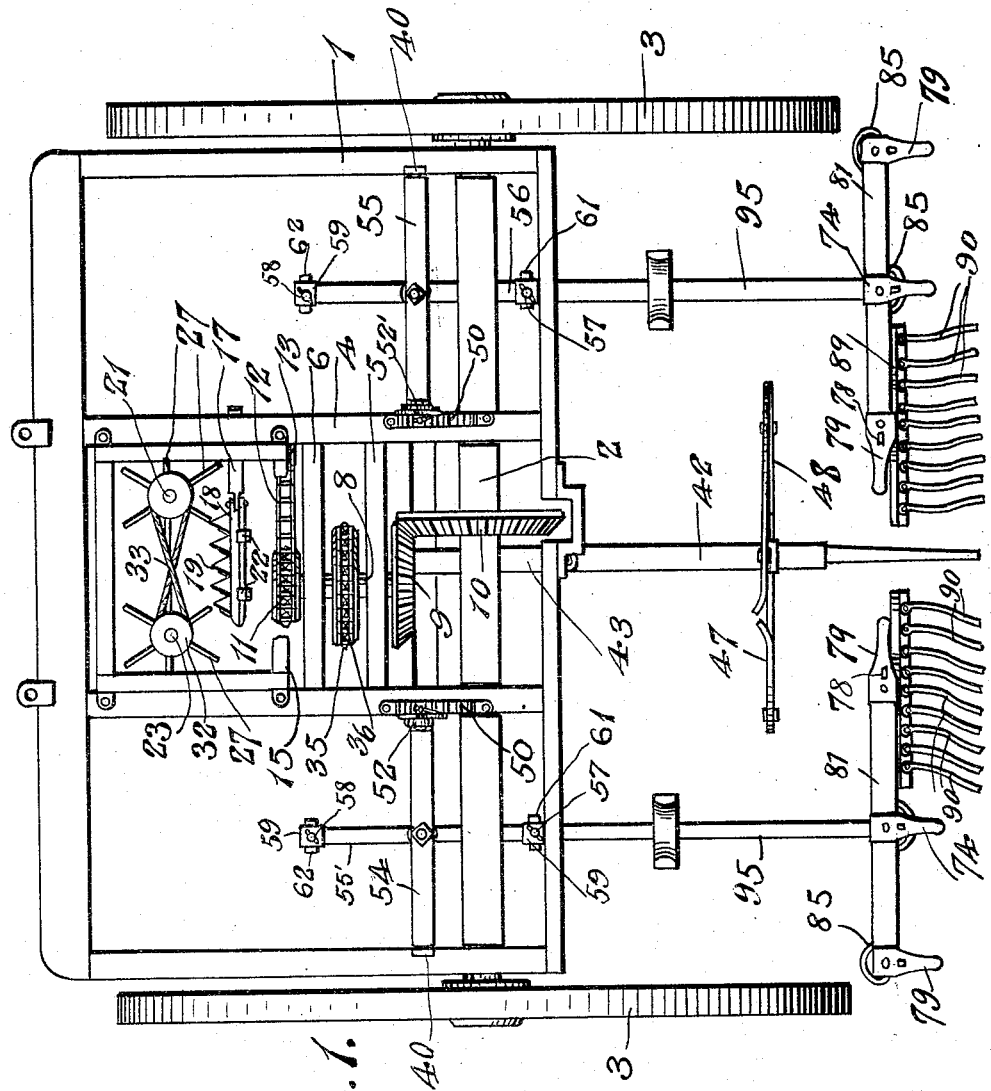

T. L. CARR.
COTTON CULTIVATOR AND CHOPPER.
APPLICATION FILED JUNE 13, 1914.

1,183,723.

Patented May 16, 1916.
3 SHEETS—SHEET 1.

Witnesses
J. P. Wahler
Bob Meyer

Inventor,
T. L. Carr.
By A. Randolph Jr.
Attorney

T. L. CARR.
COTTON CULTIVATOR AND CHOPPER.
APPLICATION FILED JUNE 13, 1914.
1,183,723.
Patented May 16, 1916.
3 SHEETS—SHEET 2.
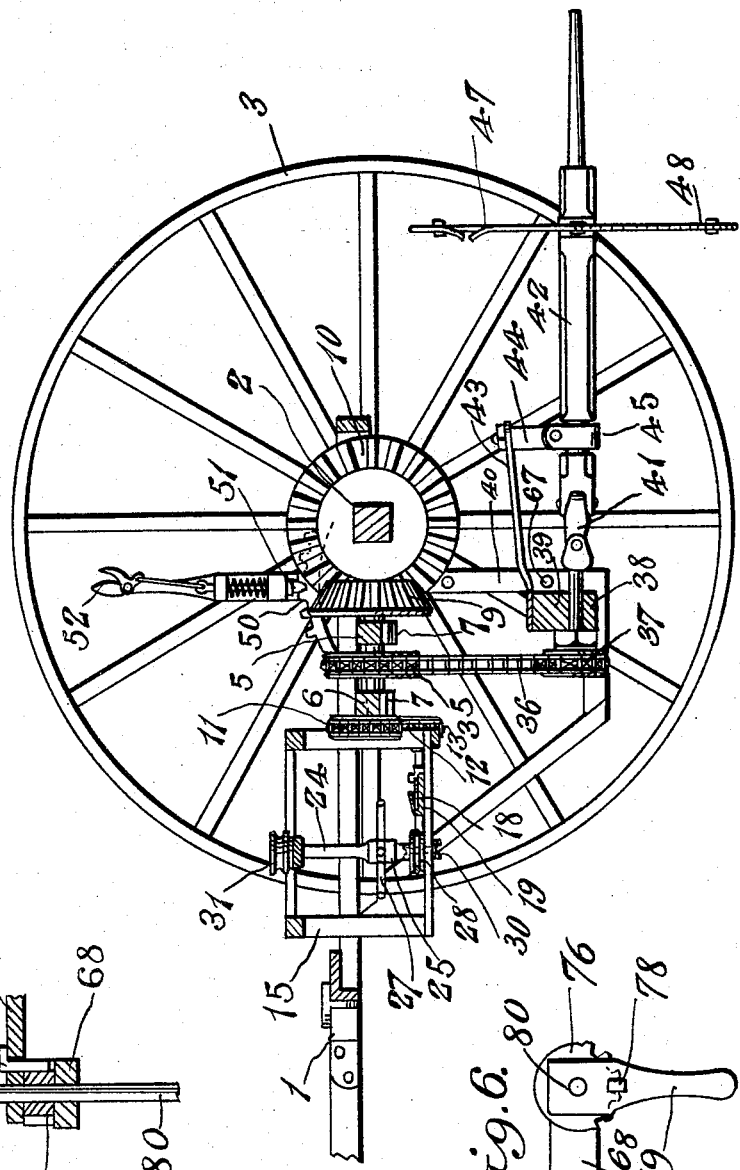
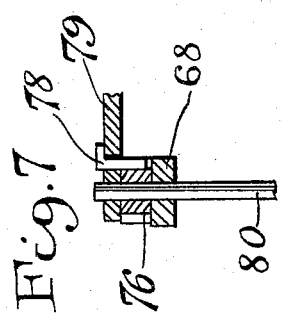
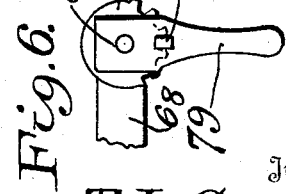
Witnesses:—
J. P. Wahler.
Robt. Meyer.
Inventor,
T. L. Carr,
By
Attorney T. L. CARR.
COTTON CULTIVATOR AND CHOPPER.
APPLICATION FILED JUNE 13, 1914.
1,183,723.
Patented May 16, 1916.
3 SHEETS—SHEET 3.
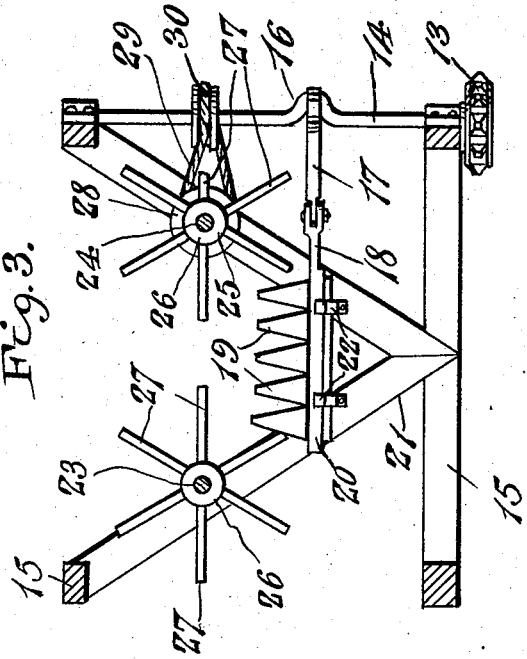
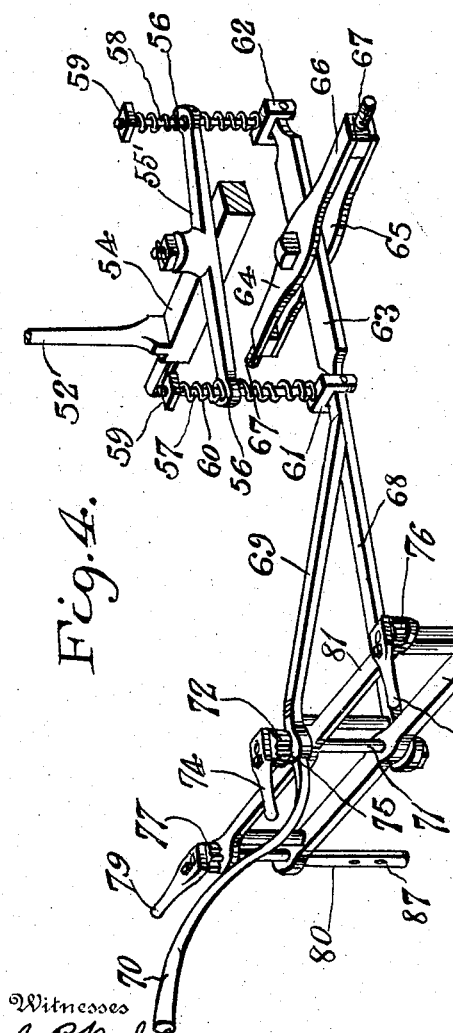
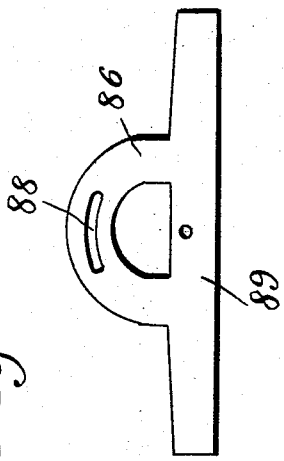
Witnesses
Inventor,
T. L. Carr.
By
Attorney

UNITED STATES PATENT OFFICE.

THOMAS L. CARR, OF HICKMAN, KENTUCKY, ASSIGNOR OF ONE-HALF TO JOHN J. RONE, OF HICKMAN, KENTUCKY.

COTTON CULTIVATOR AND CHOPPER.

1,183,723.  Specification of Letters Patent.  Patented May 16, 1916.

Application filed June 13, 1914. Serial No. 844,907.

*To all whom it may concern:*

Be it known that I, THOMAS L. CARR, a citizen of the United States, residing at Hickman, in the county of Fulton and State of Kentucky, have invented certain new and useful Improvements in Cotton Cultivators and Choppers, of which the following is a specification.

This invention relates to cotton choppers, and more particularly to a combined cotton chopper and cultivator.

The primary object of this invention is the provision of an agricultural implement as specified, which has a pair of oppositely disposed cutting knives rotatable by the traction of the implement for cutting or chopping each alternate plant in the rows over which the chopper is passed, and which also has positioned rearwardly of the arcuate chopping or cutting knives, cultivating shovels, which cultivating shovels are attached to the supporting frame so that the angles at which they travel with respect to the traction of the implement may be varied to suit practical conditions.

A still further object of this invention is the provision of a reciprocatory cutter bar positioned forwardly of said arcuate cutting knife and reciprocable by the traction of the implement.

With the foregoing and other objects in view, this invention consists in such novel features of construction, combination, and arrangement of parts as will be hereinafter more fully described, illustrated in the accompanying drawings, and claimed.

In describing the invention in detail, reference will be had to the accompanying drawings, wherein like characters of reference designate like or corresponding parts throughout the several views, and in which:—

Figure 1 is a top plan view of the improved cotton chopper and cultivator. Fig. 2 is a sectional view through the cotton chopper and cultivator. Fig. 3 is a fragmentary view, in plan, of the reciprocatory cutting bar, Fig. 4 is a perspective view of the manner of mounting the cultivating shovels upon the supporting frame, Fig. 5 is a detail view of a part of the mechanism for attaching the cultivating shovels to the supporting frames therefor, Fig. 6 is a detail plan view of a part of the mechanism for adjusting the angle of travel of the cultivating shovels or blades with respect to the line of travel of the implement, and Fig. 7 is a detail sectional view through Fig. 6.

Referring more particularly to the drawings, 1 designates the supporting frame of the agricultural implement, which has the traction wheel supporting axle 2 journaled therein. The axle 2 is square in cross section, intermediate its ends, and it has its terminal ends reduced and circular in cross section, and seated in suitable journal boxes, (not shown) which are supported by the frame 1. The reduced terminal ends of the shaft 2 have the ordinary type of traction wheels 3 mounted thereupon.

The frame 1 has an auxiliary frame 4 secured thereto, which auxiliary frame has transversely extending cross pieces 5 and 6. The cross pieces 5 and 6 have journaled in suitable bearings 7, which are secured to the under surface thereof, a stub shaft 8, upon the rear terminal end of which a bevel gear 9 is mounted. The bevel gear 9 meshes with a bevel gear 10, which is mounted upon the axle 2, substantially intermediate its ends, and which bevel gear is rotated by the rotation of the axle due to the rotation of the wheels 3 during the traction of the cultivator and chopper.

A sprocket 11 is mounted upon the forward terminal end of the stub shaft 8, and a sprocket chain 12 passes thereabout, and about a sprocket 13. The sprocket 13 is mounted upon one end of a shaft 14, which shaft is supported by an auxiliary rectangular frame 15, which frame is secured to the auxiliary frame 4 toward the forward end of the machine. The shaft 14 has a crank portion 16 formed thereon. A crank or pitman rod 17 is connected to the apex of the crank portion 16, and to one end of a cutter bar 18. The reciprocatory cutter bar 18 has a plurality of forwardly projecting cutter blades carried thereby, which cutter blades travel between the guards 19, and are provided for topping cotton plants. The guards 19 are supported by a bar 20, which bar is secured to a V-shaped brace 21 by straps 22. The V-shaped brace 21 has its apex extending toward the rear end of the cultivator and chopper, and it is secured to the rear end of the supporting frame 15 in any suitable manner. Vertical shafts 23 and 24 are supported by the legs of the V-shaped bracket 21, forwardly of the cutter bar construction, and they have feeding or guiding members 25 rotatably mounted thereupon. The feeding or guiding members 25 constitute hubs 26, which are mounted upon the vertical shafts 23 and 24, and which have a plurality of longitudinally spaced radiating arms 27 secured thereto. The vertical shaft 24 has a pulley 28 mounted thereupon, which pulley has belted connection, through a twisted belt 29, with a pulley 30, which is mounted upon the shaft 14, so that the feeding or guiding members will be rotated vertically synchronously with the reciprocatory movement of the cutter bar. The shaft 24 has a second pulley 31 mounted upon its upper end and the shaft 23 has a pulley 32 mounted upon its upper end, which pulley has belted communication by a twisted belt 33 with a pulley 31, so that the feeder or guide 25 which is mounted upon the shaft 23, will be rotated in the opposite direction to the rotation of the feeder or guider 25, which is mounted upon the shaft 24 thereby causing the two feeders to rotate toward each other for guiding the tops of the cotton plants therebetween and into engagement with the cutter bar construction.

A sprocket 35 is mounted upon the stub shaft, and has a sprocket chain 36 passing thereabout, which sprocket chain passes about a sprocket 37. The sprocket 37 is mounted upon one terminal end of a shaft 38, which shaft is rotatably mounted in and supported by the supporting frame 39. The supporting frame 39 is suspended beneath the frame 1 by suitable depending arms 40. The shaft 38 has a swiveled connection to a universal joint 41, with a shaft 42, which shaft extends rearwardly of the frame 39 and extends longitudinally of the line of travel of the chopper and cultivator. The supporting bracket 39 has a substantially resilient arm 43 connected thereto, which arm extends rearwardly therefrom, and is detachably connected to a bifurcated member 44, which bifurcated member has pivoted connection with the collar 45, which collar is rotatably mounted upon the shaft 42, and thus the shaft 42 is rotatably supported rearwardly of the universal joint 41. The shaft 42 has oppositely disposed arcuate cutting knives 47 and 48 mounted thereupon, toward the rear end of the same, which knives have their terminal ends flared outwardly so as to engage and chop or cut each cotton plant which they engage, and they are so shaped that they will engage and cut out, or chop off, only each alternate plant in the row over which the chopper and cultivator is moving.

The auxiliary frame 4 has mounted on opposite sides thereof, quadrants 50, the teeth of which coact with the dog or pawl mechanism 51, which is carried by the hand levers 52. The hand levers 52 are pivotally connected to the sides of the auxiliary frame 4, and they have their lower terminal ends secured to cross pieces 54 and 55, which cross pieces are pivotally carried by vertically depending arms, which arms are secured to the frame 1. The cross piece 54 has an arm 55' pivotally connected intermediate its ends thereto, which bar has its terminal end enlarged and provided with transversely extending openings 56, in which are slidably seated bolts 57 and 58. The bolts 57 and 58 have nuts 59 mounted upon their upper terminal ends, against which nuts, and the upper faces of the enlarged terminal ends of the bar 55', spiral springs 60 engage, providing cushioning means for the longitudinal movement of the bolts 57 and 58 within the openings 56. The lower terminal ends of the bolts 57 and 58 have U-shaped brackets 61 and 62 formed thereupon. The bracket 62 is pivotally connected to the terminal end of an arm 63, while the bracket 61 is pivotally connected to the arm 63 intermediate of its ends. The arm 63 is pivotally mounted between the upper and lower plates 64 and 65 of a supporting arm 66, which supporting arm has circular shanks 67 formed upon its terminal ends, which shanks are rotatably seated in the depending arms which support the cross pieces 5.

A substantially rectangular skeleton frame 68 is pivotally connected to the rear terminal end of the arm 63, and it is mounted upon the upper side of the arm. The bracing arm 69 is secured to the arm 63 and extends upwardly therefrom, being positioned upon the upper side of the skeleton frame 68, from which it extends rearwardly and has a handle 70 formed upon its rear terminal end, for the manual manipulation of the arm 63, and the parts carried thereby. The skeleton frame 68 has a vertically extending pin 71 intermediate its ends, which pin is rotatably seated in the terminal end of the arm 63, and in an enlarged bearing portion 72, which is formed upon the bracing arm 69. The pin 71 has a handle 74 mounted upon its upper terminal end, which handle has a slidable lug carried thereby, and projecting vertically therethrough, for engagement with the peripheral teeth which are formed upon the enlargement 75, formed upon the upper face of the bearing 72. The terminal end of the upper plate of the skeleton frame 68 has arcuate racks 76 and 77 formed upon its upper faces, the teeth of which racks are provided for the reception of the slidable pins 78, which are carried by the handle 79. The handles 79 are rigidly mounted upon the upper terminal end of the shovel or cultivating blade supporting bars 80, which bars extend downwardly through the upper and lower longitudinally extending bars 81 and 82 of the skeleton frame 68.

The cultivator element supporting rods 80, which are positioned at the outer edges of the supporting frame 1 have the ordinary type of cultivating shovels 85 mounted upon their lower terminal ends. The cultivator element supporting rods 80, which are positioned inwardly toward the center of the frame have substantially semi-circular plates 86 connected to their lower terminal by the insertion of bolts (not shown), through the openings 87, which are formed in the ends of the bars 80, and through the arcuate slots 88, which are formed in the plates 86. The plates 86 are formed upon the upper edge of plates 89, which extend transversely to the line of travel of the cultivating and chopping implement. The plates 89 have a plurality of resilient cultivating blades 90 secured thereto, which blades are arcuate, curving outwardly from the center of the cultivator frame, so as to efficiently cultivate the cotton plants during the operation of the machine. By the provision of the handle 74, which is secured to the rod 71 for moving the skeleton frame 68, the cultivating shovels 85 and the plates 89 which carry the cultivating blades 90, may be controlled for changing the angle of their line of travel, with respect to the line of travel of the cultivator, by the provision of the handle 79, which coacts with the quadrant 76 and the rods 80, the shovels 85 of the blades 90 may be moved independent of each other, and thus the cultivating elements may be positioned for travel oppositely obliquely of the line of travel of the cultivator frame, or regulated to suit practical conditions.

The cross bar 55 has a cultivating element supporting structure 95 secured thereto, which is identical in construction with the cultivating supporting element mechanism which has been heretofore described as being attached to the bar 54, and like reference numerals have been applied to the cultivator element supporting structure 95.

From the foregoing description, taken in connection with the accompanying drawings, the advantages of the construction and of the method of operation of the improved cotton cultivator and chopper will be apparent to those skilled in the art to which this invention appertains, and, while in the foregoing the principle of the operation has been described, together with various features of construction, it is to be understood that certain minor features of construction, combination, and arrangement of parts may be altered to suit practical conditions, provided such alterations are comprehended within the scope of what is claimed.

What is claimed is:—

1. In a cotton chopper and cultivator, the combination, of a wheeled structure, a cotton topping reciprocatory cutter bar carried forwardly of said structure, means carried by said wheeled structure for chopping out cotton plants after topping, and means carried by said wheeled structure rearwardly of said topping means for cultivating the cotton plants.

2. In a cotton chopper and cultivator, the combination, of a wheeled structure, a cotton topping reciprocatory cutter bar carried forwardly of said structure, means for operating said cutter bar by the travel of said structure for topping cotton plants, means carried by said wheeled structure for chopping out plants after topping, and means carried by said wheeled structure rearwardly of the topping means for cultivating the cotton plants.

3. In a cotton chopper and cultivator, the combination, of a wheeled structure, a cotton topping reciprocatory cutter bar carried forwardly of said structure, means for operating said cutter bar by the travel of said structure for topping cotton plants, means for guiding the cotton plant to said reciprocatory cutter bar, cotton plant chopping means carried by said wheeled structure rearwardly of said cutter bar, and means carried by the wheeled structure rearwardly of said cotton plant chopping means for cultivating cotton plants.

4. In a cotton chopper and cultivator, the combination, of a wheeled structure, a cotton topping reciprocatory cutter bar carried forwardly of said structure, means for operating said cutter bar by the travel of said structure for topping cotton plants, a plurality of reels positioned forwardly of and upon opposite ends of said reciprocatory cutter bar for guiding cotton plants to the cutter bar, means for rotating said reels by the travel of said wheeled structure, means carried by said wheeled structure rearwardly of said cutter bar for chopping out plants, and means carried by said wheeled structure rearwardly of said chopping means for cultivating cotton plants after topping.

5. In a cotton topper and cultivator, the combination, of a wheeled structure, a cotton topping reciprocatory cutter bar carried forwardly of said structure, means for operating said cutter bar by the travel of said structure for topping cotton plants, a pair of reels positioned forwardly of said reciprocatory cutter bar, a crank shaft operatively connected to said wheeled structure for rotation thereby, means for connecting said crank shaft and said reels for rotating said reels in a direction transversely to the direction of rotation of said crank shaft for feeding cotton plants to said reciprocatory cutter bar, means carried by said wheeled structure for chopping out cotton plants after topping, and means carried by said wheeled structure rearwardly of said chopping means for cultivating cotton plants.

6. In a cotton chopper and cultivator, the combination, of a wheeled supporting structure, a reciprocatory cutter bar carried forwardly of said supporting structure, a pair of reels positioned forwardly of said reciprocatory cutter bar, a crank shaft operatively connected to said wheeled structure for rotation by the travel of said structure, means operatively connecting said crank shaft and said reels for rotating said reels in a direction transversely to the direction of rotation of the crank shaft for feeding cotton plants to said reciprocatory cutter bar, and means operatively connecting said crank shaft and said reciprocatory cutter bar for reciprocating said cutter bar upon rotation of said crank shaft.

7. In a cotton chopper and cultivator, the combination, of a wheeled supporting structure, a cotton topping reciprocatory cutter bar carried forwardly of said supporting structure, a pair of reels positioned forwardly of said reciprocatory cutter bar, a crank shaft operatively connected to said wheeled structure for rotation by the travel of said structure, means operatively connecting said crank shaft and said reels for rotating said reels in a direction transversely to the direction of rotation of the crank shaft for feeding cotton plants to said reciprocatory cutter bar, means operatively connecting said crank shaft and said reciprocatory cutter bar for reciprocating said cutter bar upon rotation of crank shaft, means carried by said wheeled structure rearwardly of said cutter bar for chopping out cotton plants after topping, and means carried by said wheeled structure rearwardly of said chopping means for cultivating cotton plants.

8. In a cotton chopper and cultivator, the combination, of a wheeled structure, a cotton topping reciprocatory cutter bar carried forwardly by said structure, means carried by said wheeled structure for chopping out cotton plants after topping, means for guiding the plants to said reciprocatory cutter bar, and means carried by said wheeled structure rearwardly of said topping means for cultivating the cotton plants.

In testimony whereof I affix my signature in presence of two witnesses.

TOM. L. CARR.

Witnesses:
W. J. M. Murry,
P. C. McMullin.

Copies of this patent may be obtained for five cents each, by addressing the "Commissioner of Patents, Washington, D. C."